3,213,614
FUEL SYSTEM WITH PRESSURE TRANSDUCER
Kenneth G. Leslie, Flint, Mich., and Fremont T. Ogawa, Milwaukee, Wis., assignors to General Motors Corporation, Detroit, Mich., a corporation of Delaware
Filed Nov. 8, 1961, Ser. No. 151,073
8 Claims. (Cl. 60—39.48)

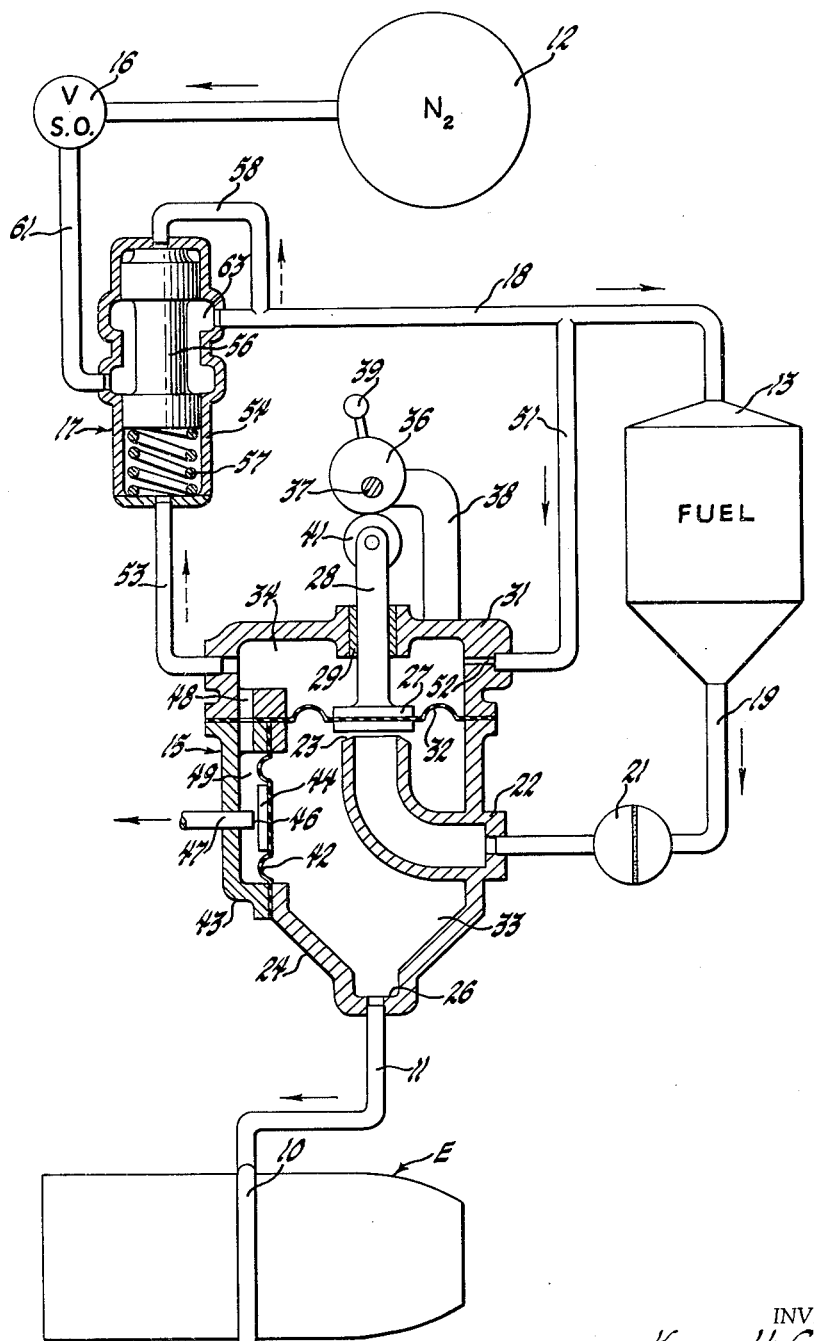

Our invention relates generally to fluid handling systems including engine fuel systems, more specifically to a throttling or metering valve, and most specifically to a pressure transducer. By the term "pressure transducer" we mean a device which develops a pressure in one fluid equal or proportional to that of another. Such a device may have various uses, particularly where it is desired to indicate, respond to, or control the pressure of a pyrophoric, radioactive, caustic, or explosive fluid, or one which solidifies at room temperatures. As the term "fluid" is used in the foregoing sentence, it includes slurries and flowable powders.

The principal objects of the invention are to provide improved systems for handling and metering dangerous or spontaneously ignitable fluids, to provide an accurate and sensitive pressure transducer, and to provide means for balancing pressures on a valve, diaphragm, or the like. The nature of the invention and the advantages thereof will be apparent to those skilled in the art from the accompanying drawing and the succeeding detailed description of a preferred embodiment of the invention.

The drawing is a schematic diagram of a system for supplying pyrophoric fuel to an engine such as a ramjet.

The engine E may be a typical ramjet or any other combustion engine and, since its structure is immaterial, it is not described. The engine typically includes a fuel manifold 10 supplied through a fuel line 11. The fuel in this case is pyrophoric; that is, spontaneously combustible in the presence of an oxidizer. For this reason, it is preferably pressurized and supplied to the engine by some source of inert gas under pressure, such as cylinder of compressed nitrogen, or a generator of combustion products under pressure. As illustrated here, a sphere 12 containing nitrogen under pressure is used to pressurize and propel fuel contained in a closed tank 13 through a fuel control or metering valve 15 into the line 11 leading to the engine. In addition to the fuel metering valve, the system includes a shut-off valve 16 which is opened to allow the nitrogen to pressurize the fuel. From the shut-off valve 16, the nitrogen flows through a pressure regulating valve 17 and a line 18 to the tank 13. The tank 13 is connected by line 19 and a rupturable diaphragm type valve 21 to the inlet conduit 22 of the metering valve. The rupturable diaphragm valve isolates the fuel from the control 15 and the engine until it is pressurized by the nitrogen, whereupon the diaphragm bursts and allows the fuel to flow. The means for controlling the flow of fuel includes the inlet conduit 22 which terminates in a valve seat 23 disposed within a generally annular valve casing 24 which has an outlet 26 connected to the fuel line 11.

The seat 23 cooperates with a movable valve disk 27 on a stem 28. The stem 28 is guided in a bushing 29 in a cover or end cap 31 for the case 24. A diaphragm 32 extending across the case 24 provides a seal between a metered fuel chamber 33 below the diaphragm and a chamber 34 above the diaphragm which is filled with nitrogen. Any suitable control, either simple or complex, may be employed to adjust the metering valve stem 28 to allow the desired fuel flow to the engine. So far as the present invention is concerned, the nature of the control is entirely immaterial. As illustrated here, control is effected by a cam 36 rotatable on a shaft 37 mounted on a bracket 38 extending from the cover 31. The cam 36 may be operated by a hand lever 39, and cooperates with a follower 41 on the stem 28. The amount of fuel passed by the metering valve 15 is a function of the area of the annular opening between the seat 23 and disk 27 and the pressure drop at this point. The control includes means to regulate this pressure drop and hold it substantially constant through the operation of the nitrogen pressure regulating valve 17. This involves the pressure transducer referred to above.

A second diaphragm 42 is mounted between the case 24 and a second cover plate 43. The diaphragm 42 mounts a valve disk 44 which defines an annular orifice with the inner end 46 of a vent tube 47. An unrestricted passage 48 through the body 24, diaphragm 32, and cover 31 connects the nitrogen chamber 34 with the chamber 49 to the left of diaphragm 42, so that functionally these are a single chamber. The diaphragms are subject to fuel pressure on one side and nitrogen pressure on the other. A branch 51 leading from the fuel pressurizing nitrogen line 18 enters chamber 34 through a restricted orifice 52. This orifice is fixed. A pressure connection 53 leads from the chamber 34 into one end of the body 54 of the regulating valve 17, which defines a generally cylindrical valve housing. A valve spool 56 having two lands is slidable within the body 54 and is biased upwardly by a compression spring 57 and by the pressure communicated through pipe 53. The spool is biased downwardly by pressure in the conduit 18 transmitted through a branch line 58. Since both ends of the valve are of equal area, the valve is in balance when the pressure in line 18 is equal to the pressure in conduit 53 plus the force of spring 57 divided by the valve area. The nitrogen shut-off valve 16 is connected into the valve case between the lands by a line 61, and the line 18 connects with an annular recess 63 in the valve case which is throttled by downward movement of valve spool 56, as illustrated. The pressure in line 18 will equal the pressure of fuel supplied to the metering valve 15. The pressure in chamber 34, 49 will automatically be regulated to equal the pressure of the metered fuel in chamber 33 because, if the pressure in chamber 34, 49 is greater than the pressure of metered fuel, it will move diaphragm 42 to open the valve 46 which will increase flow out of vent 47 and thus reduce the pressure by increasing the flow through restriction 52. Or, if the pressure in chamber 34, 49 is lower than that of the metered fuel, the diaphragm will move to the left to throttle the flow and build up the nitrogen pressure. It is apparent that the supply pressure of nitrogen in line 51 must be somewhat greater than the highest pressure in chamber 33. It will be, because there will be a pressure drop across the metering valve. The pressure in chamber 34, 49, which is transmitted to the regulating valve 17, tends to open the valve and will open it until the pressure in line 18 acting on the other end of the valve is greater than that of metered fuel by the differential determined by the spring 57. In this connection, spring 57 preferably has a low rate so that the force of the spring varies little with the valve opening.

It will be apparent that the structure of the fuel metering valve 15 in general, or that of the pressure transducer, may be employed in systems other than that described here. The pressure transducer may be used wherever it is desirable to transmit the pressure of a fluid by using a second fluid. While the pressure transducer continuously uses the nitrogen gas, there is not much waste. It has been calculated that the gas used may be one-half to one pound per hour in a typical installation.

It should be noted that the fluid used to transmit pressure need not be the same as the pressurizing fluid, but it is desirable for it to be the same. Also, the line 51 need not be supplied from the line 18 downstream of the regulating valve; it may be supplied by unregulated or reservoir pressure by connecting it to line 61. In this case, the full nitrogen pressure will be supplied to the orifice 52 when the system is in operation.

The pressure transducer can be employed independently of its function in balancing the pressure on the metering valve sealing diaphragm 32. One advantage of the fuel control device 15 lies in the fact that the pressure of fuel on the diaphragm 32 is balanced by an equal gas pressure. This minimizes strain on the diaphragm and greatly reduces resistance to closing of the throttling valve. As will be apparent, a balanced type of throttling valve could be substituted for the type of valve illustrated, which is unbalanced to the extent of the difference between unmetered and metered fuel pressure over the area of the valve seat 23.

It is significant that the fuel control system illustrated provides both a variable metering orifice for the fuel and accurate regulation of the pressure drop across the orifice without any relatively sliding or otherwise sensitive parts exposed to the pyrophoric fuel or other potentially troublesome fuel. In a system such as that illustrated, when the fuel is exhausted, the nitrogen continues to flow and will purge the metering valve. However, some fuel may remain and create deposits.

The advantages of the system and of the elements thereof defined by the succeeding claims will be apparent to those skilled in the art. It will also be apparent that many modifications of structure may be made by exercise of skill in the art without departing from the invention, the preferred embodiment of which has been described above.

We claim:

1. A fuel system comprising, in combination, means containing a fluid fuel, means for supplying a propelling fluid to the said means to pressurize the fuel, a metering valve for the fuel, outlet means for the fuel supplied by the metering valve, a pressure transducer responsive to pressure of the fuel downstream of the valve and creating an equal pressure in a conduit containing the said propelling fluid, and a pressure regulating valve referenced to the pressure in said conduit controlling the pressure of propelling fluid supplied to the fuel containing means.

2. A system as recited in claim 1 in which the pressure regulating valve maintains a substantially constant differential between the pressure of the propelling fluid and the pressure of fuel downstream of the valve.

3. A system as recited in claim 1 in which the pressure transducer comprises a body defining a cavity, means including a movable wall mounted in the body dividing the cavity into first and second chambers, means for admitting the fuel into the first chamber, a first orifice connecting the means for supplying propelling fluid to a second chamber, a second orifice venting the second chamber, and means actuated by the movable wall to constrict the second orifice in response to excess of pressure in the first chamber over that in the second, with the result that pressure in the second chamber is maintained equal to that in the first chamber.

4. A fuel system comprising, in combination, means containing a fluid fuel, means for supplying a propelling fluid to the said means to pressurize the fuel, a metering valve for the fuel, outlet means for the fuel supplied by the metering valve, a pressure transducer responsive to pressure of the fuel downstream of the valve and creating an equal pressure in a conduit containing the said propelling fluid, and a pressure regulating valve referenced to the pressure in said conduit controlling the pressure of propelling fluid supplied to the fuel containing means; the pressure transducer comprising, in combination, a body defining a cavity, means including a movable wall mounted in the body dividing the cavity into first and second chambers, means for admitting the fuel into the first chamber, a first orifice connecting the means for supplying propelling fluid to the second chamber, a second orifice venting the second chamber, and means actuated by the movable wall to constrict the second orifice in response to excess of pressure in the first chamber over that in the second, with the result that pressure in the second chamber is maintained equal to that in the first chamber; the metering valve comprising a second movable wall disposed between the first and second chambers, a valve controlling admission of the fuel into the first chamber controlled by movement of the second movable wall, and valve control means connected to move the second wall.

5. A fuel control device comprising, in combination, a body defining a cavity, means including a movable wall mounted in the body dividing the cavity into first and second chambers, means for admitting fuel into the first chamber, an outlet for fuel from the second chamber, a source of a second fluid at a pressure higher than the maximum pressure of the fuel, a first orifice connecting the source to the second chamber, a second orifice venting the second chamber, and means actuated by the movable wall to constrict the second orifice in response to excess of pressure in the first chamber over that in the second, with the result that pressure in the second chamber is maintained equal to that in the first chamber, a second movable wall disposed between the first and second chambers, and a valve controlling admission of the fuel into the first chamber sealed by the second movable wall.

6. A fluid throttling device comprising, in combination, a body defining a cavity, means including a movable wall mounted in the body dividing the cavity into first and second chambers, means for admitting a first fluid into the first chamber, an outlet for the first fluid from the first chamber, a source of a second fluid at a pressure higher than the maximum pressure of the first fluid, a first orifice connecting the source to the second chamber, a second orifice venting the second chamber, and means actuated by the movable wall to constrict the second orifice in response to excess of pressure in the first chamber over that in the second, with the result that pressure in the second chamber is maintained equal to that in the first chamber, a second movable wall disposed between the first and second chambers, a valve controlling admission of the first fluid into the first chamber movable with the second movable wall, and valve control means connected to move the second wall and valve.

7. A pressure transducer comprising, in combination, a body defining a cavity, a wall in the body dividing the cavity into first and second chambers, means for admitting a first fluid into the first chamber, a source of a second fluid at a pressure higher than the maximum pressure of the first fluid, a first orifice connecting the source to the second chamber, a second orifice venting the second chamber, and means actuated to constrict the second orifice in response to excess of pressure in the first chamber over that in the second, with the result that pressure in the second chamber is maintained equal to that in the first chamber.

8. A pressure transducer comprising, in combination, a body defining a cavity, means including a movable wall mounted in the body dividing the cavity into first and second chambers, means for admitting a first fluid into the first chamber, a source of a second fluid at a pressure higher than the maximum pressure of the first fluid, a first orifice connecting the source to the second chamber, a second orifice venting the second chamber, and means actuated by the movable wall to constrict the second orifice in response to excess of pressure in the first chamber over that in the second, with the result that pressure in the second chamber is maintained equal to that in the first chamber.

References Cited by the Examiner

UNITED STATES PATENTS 2,398,201  4/46  Young et al. _____ 60—35.6
2,882,680  4/59  Jamison et al. _____ 60—39.28

SAMUEL LEVINE, *Primary Examiner.*

JULIUS E. WEST, *Examiner.*